Patented Aug. 28, 1928.

1,682,239

UNITED STATES PATENT OFFICE.

WALTER A. PATRICK, OF BALTIMORE, MARYLAND, ASSIGNOR TO THE SILICA GEL CORPORATION, OF BALTIMORE, MARYLAND, A CORPORATION OF MARYLAND.

GEL AND METHOD OF PREPARING THE SAME.

No Drawing.   Application filed February 18, 1921.   Serial No. 446,108.

The present invention relates to adsorbent and catalytic gels and methods of making the same. In my Patent No. 1,297,724 for silica gel and process of making same, I disclosed and claimed a new method of producing hard porous highly adsorbent gels. The specific example mentioned in the patent is silica gel.

Prior to my patent the only known way of producing gels employed the slow and impracticable step of dialysis. This was a laboratory method and would never have permitted the manufacture of gels in such quantities and cheap enough, so that they could be employed in the arts. My patent above mentioned describes how to avoid this step and manufacture gels cheaply and quickly so that they can be utilized in many fields.

The present invention relates to other species of the invention disclosed in the patent. More specifically it is directed to a method of producing metallic oxide gels, such as gels of tin oxide, aluminum oxide, tungstic oxide, and titanium oxide either singly or in combination; and also the gels themselves as products of manufacture.

The principal object of the invention is to produce a gel of each of the above oxides possessing great adsorbing powers, and by a method which is commercially practicable.

For the method of the present invention I carefully determine the concentrations of an acid and the solution of a soluble salt, such as a sodium salt, of the acid of one of the oxides mentioned above, such that when mixed, will set to a hydrogel within four or five hours after mixing. Great care must be exercised in bringing the acid and the salt together, in order to avoid a rapid coagulation. To prevent this coagulation it is necessary to vigorously stir the solutions at the moment of mixing. The amounts of the salt solution and the hydrogen ions coming from the acid solution used are such as to give a final concentration of the acid varying between one-tenth and five-tenths mols per litre. In the cases of the stannate and the tungstate the final hydrogen ion concentration of the acid is preferably as high as five-tenths mols per litre. With the other three salts however, the acid concentration need not be so high, preferably being in the neighborhood of one or two-tenths mols per litre. The salt solutions should preferably be of a concentration of from 3% to 7% by weight. Care should be taken to add the salt to the acid, or to bring them together simultaneously. If the acid is added to the salt, the result will be a failure.

In order that the steps of the method may be better understood the application of the invention to the production of tungstic oxide gel will be set forth as an example. For this purpose a 3 to 7% solution of sodium tungstate is added to an acid, for example hydrochloric or sulphuric acids, until the concentration of the acid in the mixture is from one-tenth to five-tenths mols per litre. The sodium tungstate and acid are thoroughly stirred at the time of mixing to prevent premature coagulation. The mixture sets to a hydrogel in a short time and is then broken into pieces and dried as directed hereinafter.

The temperature of the solutions during the time of mixing and setting is an important factor in the time required for the setting of the hydrogel. At a temperature of about 50° C. the mixture sets to a hydrogel in 30 minutes to one hour and the product is just as good as the gel formed by mixing the solutions at a lower temperature but requiring a considerably longer time to set. Usually the solutions at the time of mixing and during setting are at atmospheric temperature, but satisfactory results may be obtained at temperatures from 15° to 80° C. On mixing the acid and the soluble salt solutions, a colloidal solution of the acid corresponding to the oxide is first formed. It is from this solution that the compound sets to a hydrogel.

The hydrogel which is formed by allowing the mixture to set is then broken into pieces and washed free from acid and salt. If the wash water is heated, this step is expedited. Care should be taken not to subject the hydrogel to any crushing during the washing and until hard. The washed hydrogel must now be carefully dried to obtain the hard gel. It is essential that the water be removed slowly in the drying operation, as the resulting finely porous condition of the gel obtained depends upon the proper drying of the hydrogel. To this end the hydrogel is first dried in a stream of air at 75° to 120° C. After this heating the gel will still contain a considerable quantity of water and the greater part of this is driven off by increasing the temperature slowly up to 300° to 400° C. It may however be dried at 120°, but this will take longer. In a general way, it may be said that not all the water should be driven out of the gel. The resulting product is a most stable substance which can be safely heated to relatively high temperatures such as 700° C. without fear of injury. The method of drying may be modified by taking the material after the first heating step as above described, and subjecting the same to a vacuum to further remove the water, the temperature during this vacuum treatment being from 75° to 120° C. The product obtained by this method is just as stable as if the water had been removed by a further heating up to 300° to 400° C. The gel which is dried in a vacuum is also stable to relatively high temperatures, such as 700° C.

The final product is a hard, transparent substance very closely resembling glass in appearance. When prepared in the above manner, it is very porous, the pores being ultra-microscopic and of exceedingly fine dimensions. It is because of this fine porous structure that the gels are such efficient adsorbing mediums. The hardness which the gels possess is a desirable property for the reason that the gels will retain their shape and structure and not crumble or pack when placed in a vessel for the purpose of adsorbing fluids.

In the foregoing description it was stated that a solution of the sodium salt of the acid corresponding to the oxide is employed. It is to be understood however that any soluble salt of the acid corresponding to the oxide may be employed. The gels prepared in accordance with this invention, in addition to being efficient adsorbents of fluids, also possessed marked catalytic activity.

By mixing solutions of soluble salts of the acids of a plurality of said oxides and an acid, a gel will be obtained which may be termed a plural oxide gel. The concentrations and quantities of the solutions are determined as already described, and the hydrogel formed by the mixing should be dried as previously set forth. In this manner plural gels of any number or combination of said oxides may be obtained. For example a plural gel of stannic oxide and tungstic oxide may be obtained by mixing with vigorous stirring 3 to 7% solutions by weight of sodium stannate and sodium tungstate, and a solution of acid, for example hydrochloric, until the acid in the mixture has a hydrogen ion concentration of one-tenth to five-tenths mols per litre. Then the mixture is allowed to set to a gel, broken into pieces and dried as described herein.

Having described the invention, what is claimed as new and desired to be secured by Letters Patent is:

1. In the process of preparing tungstic oxide gel, the step of adding a 3 to 7% solution of sodium tungstate to an acid with thorough stirring until the amount of sodium tungstate added results in a final concentration of hydrogen ions resulting from the acid in the mixture of from one-tenth of five-tenths mols per litre.

2. The process of preparing tungstic oxide gel consisting in adding with thorough stirring a soluble tungstate solution to an acid solution, said acid solution being in excess of the quantity required to react with said salt solution, and said solutions being of such concentrations and amounts that the resulting mixture will set to a hydrogel without removal of any of the excess acid and salt, thereafter washing out the excess acid and salt, and drying the resulting product.

3. The process of preparing tungstic oxide gel consisting in adding a solution of a soluble tungstate to an acid, thoroughly stirring the same at the moment of mixing, allowing the resulting mixture to set to a hydrogel, washing and then slowly removing moisture from said hydrogel.

4. The process of preparing tungstic oxide gel consisting in adding a solution of a soluble tungstate to an acid, thoroughly stirring the resulting solutions at the moment of mixing, allowing the mixture to set to a hydrogel, washing said hydrogel to remove acid and salt, drying the hydrogel in a current of air heated to 75° to 120° C. and then slowly increasing the temperature to a point not exceeding 400° C.

5. In the process of preparing tungstic oxide gel the steps of allowing a colloidal solution of tungstic acid to set to a hydrogel, drying the hydrogel in a current of air heated to 75° to 120° C. and then slowly increasing the temperature.

6. In the process of preparing tungstic oxide gel the steps of allowing a colloidal solution of tungstic acid to set to a hydrogel, drying the hydrogel in a current of air heated to 75° to 120° C. and then slowly increasing the temperature to 300° to 400° C.

7. In the process of preparing tungstic oxide gel the steps of allowing a colloidal tungstic acid solution to set to a hydrogel, drying the hydrogel in a current of air heated to 75° to 120° C. and then slowly increasing the temperature to a point not exceeding 400° C.

8. In the process of preparing tungstic oxide gel, the steps of allowing a colloidal solution of tungstic acid to set to a hydrogel, drying the hydrogel in a current of air heated to 75° to 120° C., subjecting the hydrogel to a vacuum and then further heating the gel.

9. The process of preparing tungstic oxide gel consisting in adding a solution of a soluble tungstate to an acid, thoroughly stirring the resulting solutions at the moment of mixing, allowing the mixture to set to a hydrogel, washing said hydrogel to remove acid and salt, drying the hydrogel in a current of air heated to 75° to 120° C. to drive off a part of the moisture, and then slowly increasing the temperature of the air to drive off the greater part of the remaining moisture.

10. In the process of preparing tungstic oxide gel, the step of adding a solution of sodium tungstate to an acid with thorough stirring until the amount of tungstate added results in a final concentration of hydrogen ions resulting from the acid in the mixture of from one-tenth to five-tenths mols per litre.

11. A plural oxide gel including tungstic oxide having ultra-miscropic pores and stable in the presence of air up to a high temperature.

12. The process of preparing a plural oxide gel including tungstic oxide consisting in the steps of adding a solution of a soluble tungstate salt and soluble salts of the acids of the other oxides, to an acid with thorough stirring, said acid solution being in excess of the quantity required to react with said salt solution, and said solutions being of such concentrations and amounts that the mixture will set to a hydrogel without removal of any of the excess acid and salt, thereafter washing out the excess acid and salt and drying the resulting product.

13. The process of preparing a hard porous metallic oxide gel, consisting in adding to an acid solution with thorough stirring a solution of a soluble salt of the acid of said metallic oxide which will react with the acid solution to give a homogeneous colloidal solution, the proportions and quantities of the solutions being such that the concentration of hydrogen ions resulting from the acid in the colloidal solution is from one-tenth to five-tenths mols per litre, whereupon, after some time, the colloidal solution gradually hardens into a hydrogel, breaking up the hydrogel into pieces, washing the same, and treating to remove most of the water.

14. The process of preparing a metallic oxide gel, consisting in adding to an acid solution with thorough stirring a solution of a sodium salt of the acid of said oxide which will react with the acid to give a homogeneous colloidal solution, the proportions and quantities of said acid and salt solutions being such that the concentration of hydrogen ions resulting from the acid in the colloidal solution is from one-tenth to five-tenths mols per litre, whereupon, after some time, the solution hardens into a hydrogel, breaking the hydrogel into pieces, washing, and treating to remove most of the water.

15. In the process of preparing a metallic oxide gel, the step of adding a 3% to 7% solution of a soluble salt of the acid of said metallic oxide to an acid until the amount of salt added results in a final concentration of hydrogen ions resulting from the acid in the mixture of from one-tenth to five-tenths mols per liter.

16. The process of preparing a metallic oxide gel, consisting in adding to an acid solution a solution of a soluble salt of the acid of said metallic oxide, said acid solution being in excess of the quantity required to react with said salt solution, and said solutions being of such concentrations and amounts that the resulting mixture will set to a hydrogel without removal of any of the excess acid and salt, thereafter washing out the excess acid and salt and removing water from the resulting product.

17. The process of preparing a hard, porous metallic oxide gel, consisting in adding to an acid solution with vigorous stirring a solution of a soluble salt of the acid of said metallic oxide, said acid solution being in excess of the quantity required to react with said salt solution, and said solutions being in such proportions that neither precipitation nor gelatinization occurs at once, but within a regulable time after mixing, the entire mixture will be changed over to a homogeneous jelly-like mass, which is broken up, washed to remove the salts and excess acids present, and dried.

18. The process of preparing a metallic oxide gel, consisting in adding a 3% to 7% solution of a soluble salt of the acid of said metallic oxide, to an acid solution, said acid solution being in excess of the quantity required to react with said salt solution, and said solutions being, in such proportions that neither precipitation nor gelatinization occurs at once, but within a regulable time after mixing, the entire mixture will be changed over to a homogeneous jelly-like mass, which is broken up, washed to remove the salts and excess acids present, and dried.

19. The process of preparing a metallic oxide gel, consisting in adding with vigorous stirring a 3% to 7% solution of a soluble salt of the acid of said metallic oxide, to an acid solution, in proportions to give in the mixture a concentration of hydrogen ions resulting from the acid of one-tenth to five-tenths mols per liter, allowing the mixture to set to a hydrogel which is broken up, washed to remove salts and excess acids present, and dried.

20. The process of preparing a plural oxide gel, consisting in adding to an acid solution with vigorous stirring a solution of soluble salts of the acids of two or more metallic oxides, said acid solution being in excess of the quantity required to react with said salt solutions, and said solutions being in such proportions that neither precipitation nor gelatinization occurs at once, but within a regulable time after mixing, the entire mixture will be changed over to a homogeneous jelly-like mass, which is broken up, washed to remove the salts and excess acids present, and dried.

21. The process of preparing a plural oxide gel, consisting in the steps of adding a solution of soluble salts of the acids of said oxides, to an acid solution, the salt and acid solutions being of such concentrations and amounts that the final concentration of hydrogen ions resulting from the acid in the mixture is from one-tenth to five-tenths mols per liter, allowing the mixture to set to a hydrogel without removal of any of the excess acid and salt, thereafter washng out the excess acid and salt, and removing water from the resulting product.

22. The process of preparing a plural oxide gel, consisting in adding to an acid solution a 3% to 7% solution of the soluble salts of the acids of two or more metallic oxides, in proportions to give in the mixture a concentration of hydrogen ions resulting from the acid of one-tenth to five-tenths mols per liter, allowing the mixture to set to a hydrogel which is broken up, washed to remove salts and excess acids present, and dried.

In testimony whereof I hereunto affix my signature.

WALTER ALBERT PATRICK.